(12) United States Patent
Hanschmann et al.

(10) Patent No.: US 10,279,431 B2
(45) Date of Patent: May 7, 2019

(54) LASER METAL DEPOSITION CLADDING OF WELD SEAMS IN AUTOMOTIVE PARTS

(71) Applicants: MAGNA INTERNATIONAL INC., Aurora (CA); Florian Hanschmann, Toronto (CA); Jeremy Brian Magda, Brampton (CA); Kevin Dale Smith, Sterling Heights, MI (US)

(72) Inventors: Florian Hanschmann, Toronto (CA); Jeremey Brian Magda, Brampton (CA); Kevin Dale Smith, Sterling Heights, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 99 days.

(21) Appl. No.: 14/436,893

(22) PCT Filed: Oct. 24, 2013

(86) PCT No.: PCT/US2013/066522
§ 371 (c)(1),
(2) Date: Apr. 19, 2015

(87) PCT Pub. No.: WO2014/066584
PCT Pub. Date: May 1, 2014

(65) Prior Publication Data
US 2015/0273629 A1    Oct. 1, 2015

Related U.S. Application Data

(60) Provisional application No. 61/718,102, filed on Oct. 24, 2012.

(51) Int. Cl.
*B23K 26/24* (2014.01)
*B23K 26/14* (2014.01)
(Continued)

(52) U.S. Cl.
CPC .............. *B23K 26/24* (2013.01); *B23K 9/173* (2013.01); *B23K 26/144* (2015.10);
(Continued)

(58) Field of Classification Search
CPC .... B23K 26/24; B23K 26/32; B23K 35/3033; B23K 35/0244; B23K 35/3053;
(Continued)

(56) References Cited

U.S. PATENT DOCUMENTS 4,000,392 A * 12/1976 Banas ................ B23K 26/0643
219/121.63
4,023,005 A     5/1977 Bolin
(Continued)

FOREIGN PATENT DOCUMENTS

DE      4328516 A1    9/1994
DE     19643434 A1    5/1997
(Continued)

OTHER PUBLICATIONS

Locke, David et al. Laser metal deposition defined. Insudstiral Laser Solutions for Manufacturing, vol. 250, Issue 6, Nov. 1, 2010, pp. 1-9 [online], [retrieved on Dec. 12, 2016]. Retrieved from the Internet <URL:http://www.industiral-lasers.com/articles/print/volume-250/issue-6/features/laser-metal-deposition.html>.*
(Continued)

*Primary Examiner* — Matthieu F Setliff
(74) *Attorney, Agent, or Firm* — Dickinson Wright PLLC

(57) ABSTRACT

A part, such as an automotive part, is provided. The part includes at least two work pieces which are joined together at a weld seam. The weld seam has a laser metal deposition layer with at least one of nickel and iron, and the laser metal deposition layer is substantially entirely free of silicate islands. The part further includes a painted, phosphate or (Continued)

electrocoated coating which is bonded with at least a portion of the laser metal deposition layer of the weld seam.

7 Claims, 3 Drawing Sheets

(51) Int. Cl.
| | |
|---|---|
| *B23K 26/26* | (2014.01) |
| *B23K 26/34* | (2014.01) |
| *B23K 9/173* | (2006.01) |
| *C25D 7/06* | (2006.01) |
| *C25D 11/36* | (2006.01) |
| *B23K 26/32* | (2014.01) |
| *B23K 26/342* | (2014.01) |
| *B23K 26/144* | (2014.01) |
| *B23K 101/00* | (2006.01) |
| *B23K 101/18* | (2006.01) |
| *B23K 103/04* | (2006.01) |
| *B23K 103/00* | (2006.01) |

(52) U.S. Cl.
CPC .......... *B23K 26/1476* (2013.01); *B23K 26/26* (2013.01); *B23K 26/32* (2013.01); *B23K 26/34* (2013.01); *B23K 26/342* (2015.10); *C25D 7/06* (2013.01); *C25D 11/36* (2013.01); *B23K 2101/006* (2018.08); *B23K 2101/18* (2018.08); *B23K 2103/04* (2018.08); *B23K 2103/50* (2018.08); *Y10T 403/479* (2015.01)

(58) Field of Classification Search
CPC .. B23K 2203/50; B23K 2203/04; C25D 5/02; C25D 13/20; C25D 11/36; Y10T 403/479
See application file for complete search history.

(56) References Cited

U.S. PATENT DOCUMENTS

| | | | |
|---|---|---|---|
| 4,300,474 A * | 11/1981 | Livsey | B05B 7/228 118/641 |
| 4,314,132 A | 2/1982 | Porter | |
| 5,216,220 A | 6/1993 | Davis et al. | |
| 6,080,960 A | 6/2000 | Fournier et al. | |
| 6,271,499 B1 | 8/2001 | Jones et al. | |
| 6,683,268 B2 * | 1/2004 | Briand | B23K 9/0253 219/61 |
| 2003/0222059 A1 * | 12/2003 | De Kock | B23K 9/042 219/121.63 |
| 2004/0173587 A1 | 9/2004 | Musselman | |
| 2006/0186103 A1 * | 8/2006 | Rajan | B23K 35/0266 219/145.22 |
| 2008/0057341 A1 | 3/2008 | Bouillot et al. | |
| 2008/0142125 A1 | 6/2008 | Meurer et al. | |
| 2009/0202858 A1 | 8/2009 | Herber et al. | |
| 2010/0112374 A1 * | 5/2010 | Knauf | B23K 35/0261 428/615 |
| 2011/0226746 A1 | 9/2011 | Briand et al. | |
| 2012/0114494 A1 * | 5/2012 | Ford | B22F 3/15 416/229 R |

FOREIGN PATENT DOCUMENTS

| | | | | |
|---|---|---|---|---|
| DE | 102007006688 A1 * | 8/2008 | ......... | B23K 15/0086 |
| DE | 102011077458 A1 | 12/2012 | | |
| EP | 2737971 A1 | 5/2011 | | |
| WO | 2011060432 A1 | 5/2011 | | |
| WO | WO 2012019115 A1 * | 2/2012 | ............. | B32B 15/02 |

OTHER PUBLICATIONS

Metal and Steel Classification—ASTM, AISI, SAE, ISO, and other codes. Reference guide [online]. Welders Universe 2012-2015 [retrieved on Dec. 12, 2016]. Retrieved from the Internet <URL:http://www.weldersuniverse.com/metals_classifications.html>.*

Espacenet English Language Machine Translation of DE 102007006688. Machine Translation [online]. Espacenet, 2016 [retrieved on Apr. 18, 2017]. Retrieved from the Internet: <URL:https://worldwide.espacenet.com/publicationDetails/biblio?II=0&ND=3&adjacent=true&locale=en_EP&FT=D&date=20080814&CC=DE&NR=102007006688A1&KC=A1>.*

EPC Article 94(3) Communication issued in co-pending EP Appln. No. 13848785.5, dated May 14, 2018.

* cited by examiner

LASER METAL DEPOSITION CLADDING OF WELD SEAMS IN AUTOMOTIVE PARTS

CROSS-REFERENCE TO PRIOR APPLICATIONS

This U.S. National Stage patent application claims the benefit of PCT International Patent Application Serial No. PCT/US2013/066522 filed Oct. 24, 2013 entitled "Laser Metal Deposition Cladding Of Weld Seams In Automotive Parts," which claims the benefit of U.S. Provisional Patent Application Ser. No. 61/718,102 filed Oct. 24, 2012, entitled "Laser Metal Deposition Cladding Of Weld Seams In Automotive Parts," the entire disclosures of the applications being considered part of the disclosure of this application and hereby incorporated by reference.

BACKGROUND OF THE INVENTION

1. Field of the Invention

This invention is related to welds between steel work pieces and, more particularly, to parts with coatings applied to weld seams between steel work pieces.

2. Related Art

Gas-metal arc welding (GMAW), which is also known as metal inert gas (MIG) welding, is commonly employed to weld steel work pieces together in the automotive industry. A common problem with employing GMAW to join steel work pieces is the development of silicate islands of manganese, silicone, iron, oxygen and other trace alloys. Such silicate islands may inhibit the application of a coating onto the outer surface of the weld seam. For example, coatings applied through painting, phosphating and electrocoating (e-coating) may not adhere strongly to weld seams with silicate islands.

One approach to removing the silicate islands from the weld seams of GMAW welds is to use a material abrasion process to remove the silicate islands. However, this approach requires significant consumable costs and capital. Another approach is to use chemical processes. However, chemical processes also may be costly and may not result in sufficient removal of the silicate islands from the weld seam.

There remains a significant and continuing need for an improved process to remove silicate islands from the weld seams of GMAW welds.

SUMMARY OF THE INVENTION

An aspect of the present invention is related to a part, such as an automotive part, which includes at least two work pieces that are joined together at a weld seam. The weld seam has a laser metal deposition layer which includes at least one of nickel and iron and is substantially entirely free of silicate islands. Additionally, the part includes a painted, phosphated or electrocoated coating which is bonded with at least a portion of the laser metal deposition layer of the weld seam. The bond between the laser metal deposition layer and the painted, phosphated or electrocoated coating is very strong. Since the laser metal deposition layer may be applied substantially only to the weld seam, this improved bonding between the weld seam and the coating may be achieved in a very efficient and cost effective manner. The outer surface of the weld seam with the laser metal deposition may also be significantly smoother as compared to other known weld seams without any grinding or other smoothing processes.

According to another aspect of the present invention, the laser metal deposition layer includes nickel.

According to yet another aspect of the present invention, the laser metal deposition layer includes iron.

According to still another aspect of the present invention, the coating is a painted coating.

According to a further aspect of the present invention, the coating is a phosphated coating.

According to still a further aspect of the present invention, the coating is an electrocoated coating.

Another aspect of the present invention is a method of making a part. The method includes the step of preparing at least two work pieces of steel which are joined together at a weld seam. The method continues with the step of melting with a laser beam a portion of the weld seam and a powder of at least one of nickel and iron to provide the weld seam with a substantially silicate island free laser metal deposition layer with at least one of nickel and iron. The method continues with the step of applying a coating onto at least a portion of the laser metal deposition layer through a painting, phosphating or electrocoating process.

Yet another aspect of the present invention includes the step of welding the at least two work pieces together through a gas metal arc welding process.

According to still another aspect of the present invention, the powder includes nickel.

According to a further aspect of the present invention, the powder includes iron.

According to yet another aspect of the present invention, the step of applying the coating is further defined as painting the coating.

According to still another aspect of the present invention, the step of applying the coating is further defined as phosphating the coating.

According to another aspect of the present invention, the step of applying the coating is further defined as electrocoating the coating.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
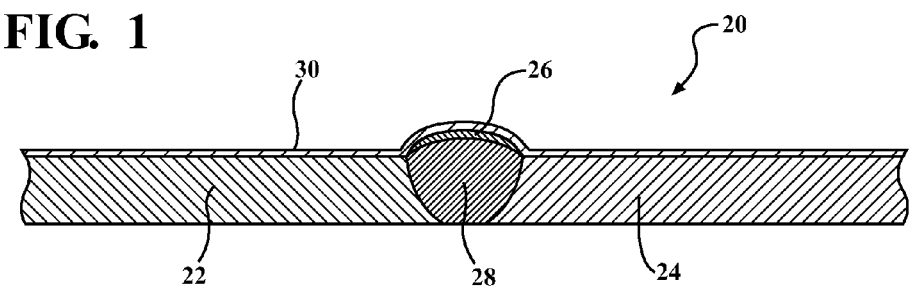
FIG. 1 is a cross-sectional view of an exemplary automotive part including an LMD layer on a weld seam and a coating applied over the LMD layer.

Referring to FIG. 1, an aspect of the present invention is related to a part 20, such as an automotive part 20, which includes at least two work pieces 22, 24 of steel that are welded together. The part 20 has a layer (hereinafter referred to as an "LMD layer 26") which includes nickel and/or iron and which was applied to an outer surface of a weld seam 28 between the work pieces 22, 24 through a laser metal deposition (LMD) process. The part 20 also includes a coating 30 which was applied on top of the LMD layer 26 through painting, phosphating or electrocoating (e-coating).

Because it is applied through an LMD process, the LMD layer 26 including nickel and/or iron is substantially entirely free of silicate islands. This allows for a strong bond between the LMD layer 26 and the coating 30, thereby reducing the risk of the coating 30 falling off of or otherwise separating from the part 20 at the weld seam 28. The LMD layer 26 may also be smoother than the outer surfaces of typical weld seams.

In the exemplary embodiment of FIG. 1, the work pieces 22, 24 are welded together in a butt joint. However, the LMD layer 26 and the coating 30 may be applied to the outer surface of the weld seam 28 of any suitable type of welding joint including, for example, an edge joint, a corner joint, a T-joint, a lap joint, etc. The work pieces 22, 24 could be any suitable automotive or non-automotive work pieces 22, 24 made of steel. For example, the work pieces 22, 24 could be pieces 22, 24 of a vehicle frame or chassis and may have any suitable thicknesses. The work pieces 22, 24 may be welded together through any suitable welding process including, for example, gas metal arc welding (GMAW). It should be appreciated that the use of the term "steel" as used herein is meant to include alloy steels.

Figure 2:
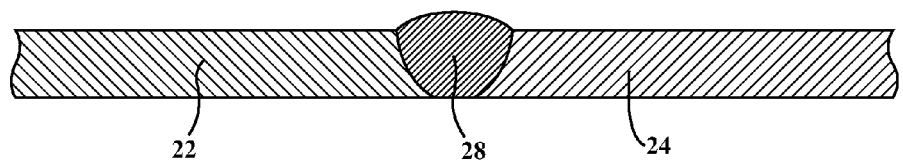
FIG. 2 is a cross-sectional view of a pair of exemplary work pieces joined together by a weld seam.

Another aspect of the present invention provides for a method of making a part, such as the automotive part 20 shown in FIG. 1. The exemplary method includes the step 100 of welding a first work piece 22 of steel to a second work piece 24 of steel at a joint to create a weld seam 28 between the first and second work pieces 22, 24. The first and second work pieces 22, 24 may be welded together through any suitable welding process including, for example, GMAW, and the joint may be any suitable type of weld joint. FIG. 2 shows exemplary first and second work pieces 22, 24 which are welded together in a butt joint with a weld seam 28 joining the first and second work pieces 22, 24.

Figure 3:
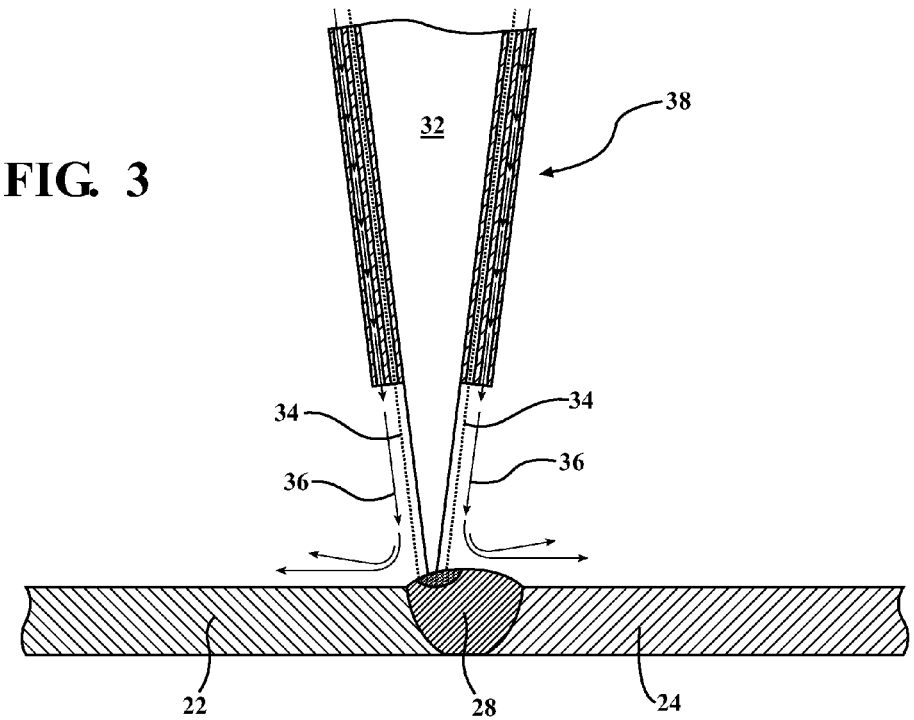
FIG. 3 is a schematic view showing an LMD head melting a portion of the weld seam of FIG. 2 and a nickel and/or iron powder.
Figure 4:
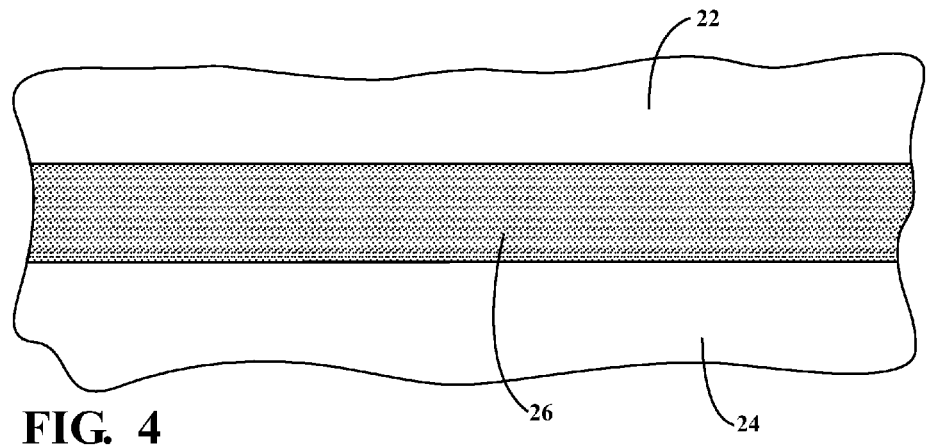
FIG. 4 is a top elevation view of a weld seam with an iron LMD layer.
Figure 5:
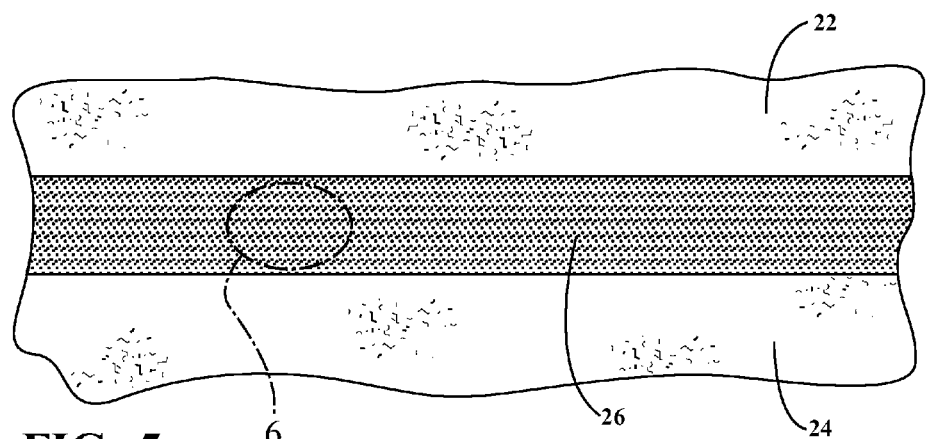
FIG. 5 is a top elevation view of a weld seam with a nickel LMD layer.
Figure 6:
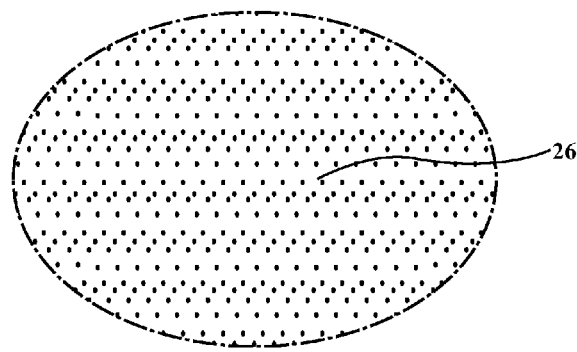
FIG. 6 is an enlarged view of the nickel LMD layer of FIG. 5.
Figure 7:
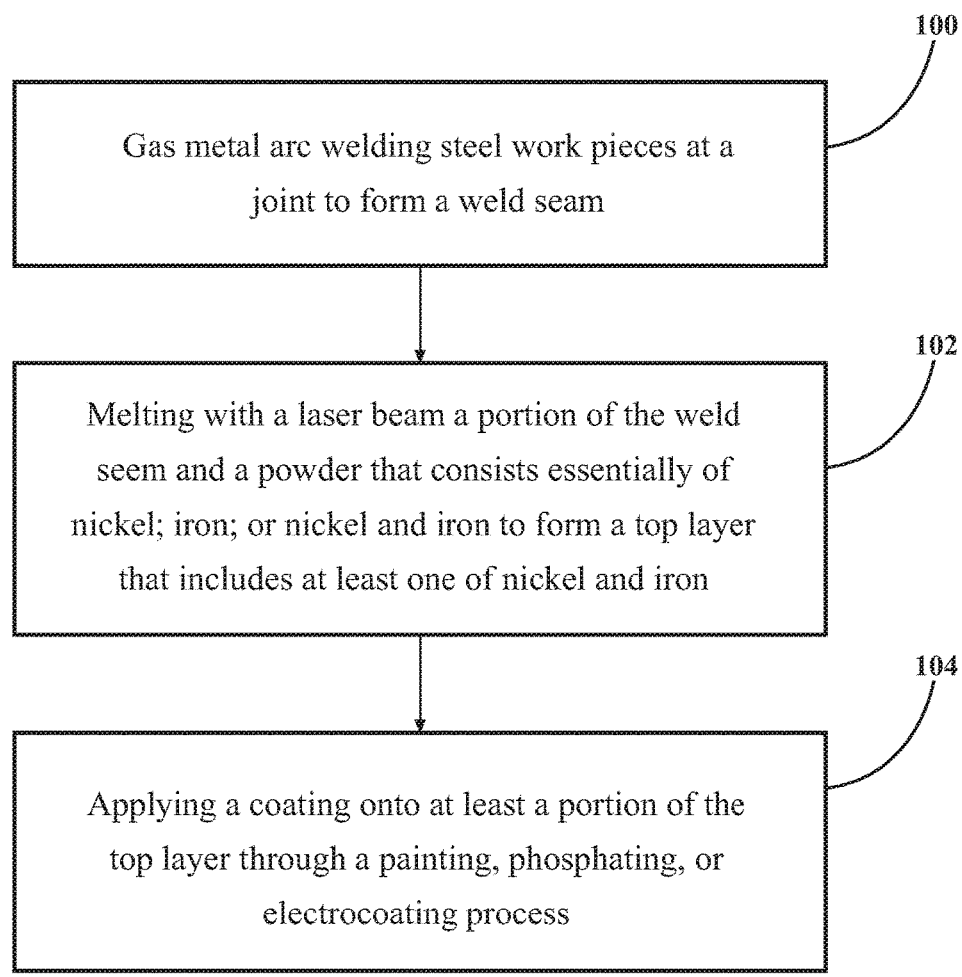
FIG. 7 is a flow chart of an exemplary method according to one aspect of the present invention.

Referring now to FIG. 3, the method continues with the step 102 of melting with a laser beam 32 a portion of the weld seam 28 and a powder 34 of iron and/or nickel to provide the weld seam 28 with a generally smooth, consistently substantially silicate island free LIVID layer 26 which has nickel or iron. Preferably, a shielding gas 36, such as of carbon dioxide and/or argon, is used during the melting step to protect the area from atmospheric gasses that could compromise the quality of the LMD layer 26. Preferably, the laser beam 32, the powder 34 and the shielding gas 36 are all simultaneously emitted from a single LMD head 38. This LIVID head 38 may be moved relative to the weld seam 28 or vice versa until the LIVID layer 26 has been applied to the desired portion of the weld seam 28. Depending, among other things, on the diameter of the laser beam 32 emitted by the LIVID head 38, more than one pass of the LMD head 38 may be required to apply the LMD layer 26 to the entire outer surface of the weld seam 28. The LMD head 38 may travel along the weld seam 28 through multiple passes in a lengthwise direction or it may travel along the weld seam 28 in a zig-zag pattern to apply the LMD layer 26 to the desired portion of the weld seam 28. The power of the laser beam 32 may be controlled to adjust the thickness of the LIVID layer 26. An exemplary weld seam 28 with the LMD layer 26 is shown in FIG. 4. The use of a laser beam 32 (shown in FIG. 3) to melt the steel of the weld seam 28 and the nickel and/or iron powder 34 is advantageous because the heat affected zone from the LIVID process may be minimized.

Referring back to FIG. 1, the method then proceeds with the step 104 of applying a coating 30 onto the first and second work pieces 22, 24 including onto at least a portion of the LIVID layer 26 through painting, phosphating or electrocoating. Because the LMD layer 26 with the nickel and/or iron is substantially free of silicate islands, the bond between the coating 30 and the LMD layer 26 is very strong. Because the LMD layer 26 is only applied to the weld seam 28, this process may be carried out in a very efficient and cost effective manner, i.e., the LMD layer 26 does not have to be applied to the outer surfaces of the other portions of the first and second work pieces 22, 24.

If a nickel powder 34 is employed, the method may include the additional step of pre-melting the weld seam 28 with the laser beam 32 without adding the nickel powder 34 and allowing it to cool before the step of melting the weld seam 28 and the powder 34. This may result in a smoother, more consistent LMD layer 26.

Obviously, many modifications and variations of the present invention are possible in light of the above teachings and may be practiced otherwise than as specifically described while within the scope of the appended claims.

The invention claimed is:

1. A method of making a part, comprising the steps of:
welding at least two work pieces of steel at a joint to form a weld seam;
melting with a laser beam a portion of the weld seam and a powder that only consists of nickel and iron or only consists of iron or only consists of nickel to form into the weld seam a top layer that includes at least one of nickel and iron and is free of silicate islands; and
without removing any material from the weld seam through material abrasion or chemical processes, applying a coating onto at least a portion of the top layer through a painting, phosphating or electrocoating process.

2. The method as set forth in claim 1 wherein the step of applying the coating is further defined as painting at least a portion of the top layer.

3. The method as set forth in claim 1 wherein the step of applying the coating is further defined as phosphating at least a portion of the top layer.

4. The method as set forth in claim 1 wherein the step of applying the coating is further defined as electrocoating at least a portion of the top layer.

5. The method as set forth in claim 1 wherein the powder consists only of nickel.

6. The method as set forth in claim 1 wherein the powder consists only of iron.

7. The method as set forth in claim 1 further including the step of simultaneously emitting the laser beam, the powder, and a shielding gas from a single head such that the powder is emitted outwardly on opposite sides of the laser beam and such that the shielding gas surrounds the laser beam and the powder.

* * * * *